US012646296B2

(12) United States Patent
Nakanoya

(10) Patent No.: US 12,646,296 B2
(45) Date of Patent: Jun. 2, 2026

(54) TRAINING DATA GENERATION APPARATUS

(71) Applicant: NEC Corporation, Tokyo (JP)

(72) Inventor: Manabu Nakanoya, Tokyo (JP)

(73) Assignee: NEC CORPORATION, Tokyo (JP)

( * ) Notice: Subject to any disclaimer, the term of this patent is extended or adjusted under 35 U.S.C. 154(b) by 403 days.

(21) Appl. No.: 18/205,035

(22) Filed: Jun. 2, 2023

(65) Prior Publication Data

US 2024/0087295 A1     Mar. 14, 2024

(30) Foreign Application Priority Data

Sep. 13, 2022    (JP) ................................. 2022-145141

(51) Int. Cl.
| | |
|---|---|
| *G06V 10/774* | (2022.01) |
| *G06T 7/246* | (2017.01) |
| *G06T 7/73* | (2017.01) |
| *G06V 10/776* | (2022.01) |

(52) U.S. Cl.
CPC ............ *G06V 10/774* (2022.01); *G06T 7/246* (2017.01); *G06T 7/73* (2017.01); *G06V 10/776* (2022.01); *G06T 2207/20081* (2013.01); *G06T 2207/30241* (2013.01)

(58) Field of Classification Search
None
See application file for complete search history.

(56) References Cited

U.S. PATENT DOCUMENTS

| | | | | |
|---|---|---|---|---|
| 2019/0080205 | A1* | 3/2019 | Kaufhold | ............. G06F 18/214 |
| 2019/0259175 | A1* | 8/2019 | Inoue | ..................... G06N 3/047 |
| 2023/0077082 | A1* | 3/2023 | Liu | ................... G01C 21/3837 |
| 2023/0419642 | A1* | 12/2023 | Joshi | ..................... G06V 10/82 |

FOREIGN PATENT DOCUMENTS

| | | |
|---|---|---|
| JP | 2021-018477 A | 2/2021 |
| WO | 2020/152927 A1 | 7/2020 |
| WO | 2020/183598 A1 | 9/2020 |

OTHER PUBLICATIONS

Georgakis, Georgios, et al. "Synthesizing training data for object detection in indoor scenes." arXiv preprint arXiv:1702.07836 (2017).
Xiao, Aoran, et al. "SynLiDAR: Learning From Synthetic LiDAR Sequential Point Cloud for Semantic Segmentation." arXiv preprint arXiv:2107.05399 (2021).

* cited by examiner

*Primary Examiner* — Vikkram Bali
(74) *Attorney, Agent, or Firm* — Sughrue Mion, PLLC

(57) ABSTRACT

A training data generation apparatus uses spatial data of an actual object and thereby trains a generative model to perform conversion from the spatial data to a feature vector and conversion from the feature vector to spatial data. Moreover, the training data generation apparatus generates a sample of the feature vector as a realization value of a probability distribution defined by a set of parameters. Moreover, the training data generation apparatus generates training data used in training for an object recognition model based on the spatial data output from the generative model when the generated sample of the feature vector is input into the generative model.

13 Claims, 10 Drawing Sheets

FIG. 3

TRAINING DATA GENERATION APPARATUS

INCORPORATION BY REFERENCE

This application is based upon and claims the benefit of priority from Japanese patent application No. 2022-145141, filed on Sep. 13, 2022, the disclosure of which is incorporated herein in its entirety by reference.

TECHNICAL FIELD

The present invention relates to a training data generation apparatus, a training data generation method, and a recording medium.

BACKGROUND ART

A technique of artificially generating training data used in training for an object recognition model that performs object recognition in a space is known. For example, Patent Literature 1 (especially a second embodiment) discloses a technique of generating training data of objects including various locations and poses by varying a modeling parameter used by a CG image (computer graphic image) generation tool.

PATENT LITERATURE

Patent Literature 1: Japanese Unexamined Patent Application Publication JP-A 2021-018477
Patent Literature 2: WO 2020/152927
Patent Literature 3: WO 2020/183598

Non-Patent Literature

Non-Patent Literature 1: Georgakis, Georgios, et al. "Synthesizing training data for object detection in indoor scenes." arXiv preprint arXiv:1702.07836 (2017) Non-Patent Literature 2: Xiao, Aoran, et al. "SynLiDAR: Learning From Synthetic LiDAR Sequential Point Cloud for Semantic Segmentation." arXiv preprint arXiv:2107.05399 (2021).

Patent Literature 1 does not specifically disclose how to vary the modeling parameter. When the modeling parameter is varied by an inappropriate method, training data of objects including locations and poses that are impossible in reality is generated. Training with such inappropriate training data adversely affects the inference accuracy of the object recognition model after the training.

SUMMARY OF THE INVENTION

An object of the present invention is to provide a training data generation apparatus, a training data generation method and a recording medium that solve the abovementioned problem.

A training data generation apparatus according to an aspect of the present invention includes a memory containing program instructions and a processor coupled to the memory. The processor is configured to execute the program instructions to: by using spatial data of an actual object, train a generative model to perform conversion from the spatial data to a feature vector and conversion from the feature vector to spatial data; generate a sample of the feature vector as a realization value of a probability distribution defined by a set of parameters; and generate training data used in training for an object recognition model based on the spatial data output from the generative model when the generated sample of the feature vector is input into the generative model.

Further, a training data generation method as another aspect of the present invention includes: by using spatial data of an actual object, training a generative model to perform conversion from the spatial data to a feature vector and conversion from the feature vector to spatial data; generating a sample of the feature vector as a realization value of a probability distribution defined by a set of parameters; and generating training data used in training for an object recognition model based on the spatial data output from the generative model when the generated sample of the feature vector is input into the generative model.

Further, a non-transitory computer-readable medium as another aspect of the present invention has a program stored therein. The program includes instructions to cause a computer to execute processes to: by using spatial data of an actual object, train a generative model to perform conversion from the spatial data to a feature vector and conversion from the feature vector to spatial data; generate a sample of the feature vector as a realization value of a probability distribution defined by a set of parameters; and generate training data used in training for an object recognition model based on the spatial data output from the generative model when the generated sample of the feature vector is input into the generative model.

With the configurations as described above, the present invention makes it possible to generate knowledge data of objects including a variety of locations and poses while suppressing the generation of training data of objects including locations and poses that are impossible in reality.

BRIEF DESCRIPTION OF DRAWINGS

FIG. 3 is a view showing an example of a configuration of a data generating unit in the training data generation apparatus according to the first example embodiment of the present invention;

EXAMPLE EMBODIMENT

Figure 1:
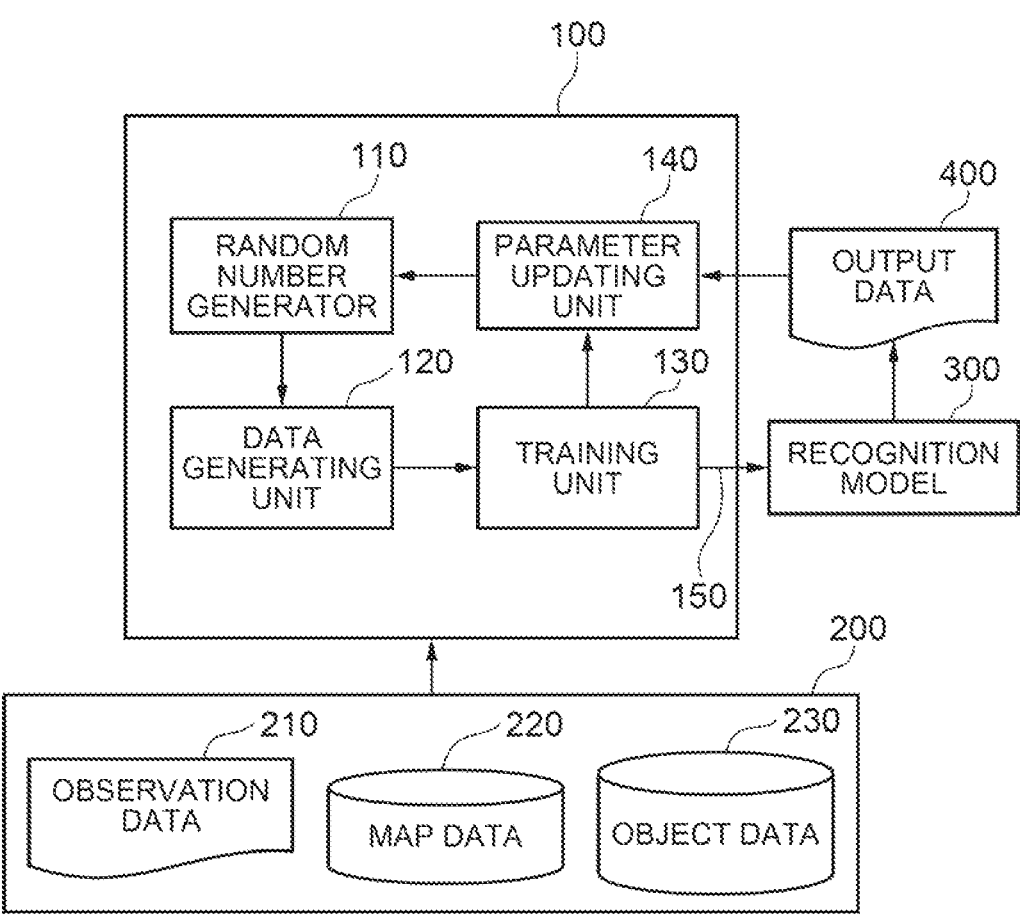
FIG. 1 is a block diagram of a training data generation apparatus according to a first example embodiment of the present invention.

Next, example embodiments of the present invention will be described in detail with reference to the drawings. In the following description, in a case where there are a plurality of identical or similar elements, a common reference numeral may be used for describing the elements without distinguishing from each other, and branch numbers may be added to the common reference numeral for describing the elements while distinguishing from each other.

First Example Embodiment

Next, a first example embodiment of the present invention will be described. First, in order to facilitate the understanding of this example embodiment, problems assumed in this example embodiment will be described in detail.

An object recognition technique of estimating, on an image and point cloud data (spatial data) obtained by capturing a space with a camera and a LiDAR (Light Detection and Ranging) sensor, the type, location, pose and the like of an object in the captured space is being applied in a wide range of fields, such as the monitoring of a public space, an industrial site and the like and robot control. One of the main approaches of the object recognition technique is an approach of learning an object recognition method based on spatial data and data (annotation data) on the types, locations and poses of objects corresponding to the spatial data, and performing inference using an inference device (recognition model) after the learning. This is generally referred to as the machine learning-based object recognition technique. The machine learning-based object recognition technique has an advantage of being robust against fluctuations in inference target spatial data and, on the other hand, has a disadvantage of requiring preparation of a large amount of spatial data that fit the distribution of the inference target spatial data for training. This means that it is required to capture a large amount of spatial data and perform a large amount of annotations (both are usually done manually), which results in a significant cost for using the machine learning-based object recognition technique.

As an approach for reducing the cost of acquisition of training data, there is an approach of artificially synthesizing spatial data used for training data. For the object recognition technique, for example, an approach of configuring spatial data by superimposing any type of detection target object data at any location on background data other than objects is disclosed in Patent Literatures 2 and 3.

Furthermore, in order to suppress the difference between the superimposed and synthesized spatial data and actual observation data (so-called "unnatural" data in which a location and a pose that are impossible in reality are combined with the background), an approach of setting a certain rule for how to combine the background and an object is also proposed. For example, Non-Patent Literature 1 discloses an approach of performing semantic segmentation on a background image to select candidates for realistic placement location of an object, estimating the distance from a stereo camera when the object is placed in the area based on depth information of the stereo camera and adjusting the drawing size of the object, and thereby superimposing the object in location and size close to actual observation data.

In addition, there is a technique of generating not only spatial data used for training data but also an image and point cloud data in general without using an imaging device such as a real camera. Typical approaches include computer simulation using a three-dimensional object model, as well as an approach of training a machine learning model (generative model) that generates pseudo data, by a Generative Adversarial Network (GAN) or an Autoencoder (AE). Although many of the approaches target the generation of two-dimensional image data, a technique of artificially generating LiDAR sensor data as in Non-Patent Literature 2 is also proposed. A generative model trained by GAN and AE can generate not only images and point cloud data, but also time-series data such as control inputs of machines and trajectories of moving objects, for example, and can generate fictitious data similar to actual data for various types of data.

However, in the training data generation approaches as disclosed in Patent Literatures 2 and 3, there is no specific disclosure of a method for selecting background data (what kind of background data to prepare, which data to select when a plurality of data are prepared) or a method for determining the location, pose and the like of a detection target object. Therefore, in the case of using these approaches, it is necessary to appropriately determine the location, pose and the like of a detection target object by some external method. This is not a problem in a where the optimal spatial data distribution is obvious (for example, in the case of recognizing an object that is shown only at an angle determined by a camera with a fixed angle of view in a constant background space). However, in the case of training for the purpose of recognizing an object that can be observed in various poses on various background data, optimal methods for selecting the background data and determining the pose and the like of the object are not obvious. There is a problem that the selection and determination based on inappropriate methods adversely affects the inference accuracy of the recognition model after the training.

Further, artificially synthesized spatial data have data characteristics (for example, unnatural outlines, light sources and shadows in the case of images, reflection intensity and scanning line locations in the case of LiDAR data) that are different from those of actual observation data. In a case where a recognition model learns such elements, there is a risk that the accuracy of inference on actual observation data decreases. The approach of reducing the difference from actual spatial data based on heuristics, such as the approach shown in Non-Patent Literature 1, can reduce a difference that can be previously assumed and predicted by the designer, but cannot respond to fluctuations and noises in an observed value caused by a hardware characteristic in sensor data and an unknown incidental factor.

The above is the problems to be solved in this example embodiment. An object of this example embodiment is to provide an apparatus, method, and recording medium for solving the above problems.

First, the overview of a training data generation apparatus in this example embodiment will be described.

The training data generation apparatus in this example embodiment generates training data with an n-dimensional (n is a natural number) vector expressing the characteristic of spatial data as input. The n-dimensional vector expressing the characteristic of spatial data is given as a realization value of a probability distribution defined by specific parameters (hereinafter referred to as random number parameters).

The generation of training data includes two main parts. One is a pseudo data generating part to determine the type, location, pose and the like of an object from the trajectory data of the object obtained from actual observation data and generate physically consistent pseudo data. The other is a data converting part to eliminate a discrepancy from the actual observation data caused by a hardware characteristic and an incidental factor by using a neural network trained by Adversarial Training, or the like.

In the training data generation apparatus in this example embodiment, a recognition model to be trained makes an inference with generated training data as an input and outputs the result of the inference.

In the training data generation apparatus in this example embodiment, based on the relation between the output inference result and the random number parameters with which the corresponding training data is generated, random number parameters for generating training data that further advances learning are estimated, and the random number parameters are updated.

The recognition model learns using training data generated based on the updated random number parameters. Thereafter, training for the recognition model is performed by repeating the data generation and the estimation and update of the random number parameters described above. That is to say, in training for a machine learning model that detects an object in a space, the training data generation apparatus according to this example embodiment provides a training data generation function to automatically generate training data in accordance with the progress of the training.

The above is the overview of the training data generation apparatus in this example embodiment. Next, a configuration of the training data generation apparatus in this example embodiment will be described in detail.

FIG. 1 is a block diagram showing an example of a configuration of a training data generation apparatus 100 in a first example embodiment of the present invention. Referring to FIG. 1, the training data generation apparatus 100 in this example embodiment includes a random number generator 110, a data generating unit 120, a training unit 130, and a parameter updating unit 140. Into the training data generation apparatus 100, input data 200 including observation data 210, map data 220 and object data 230 are input.

The observation data 210 is time-series observation data representing spatial data acquired by a camera and a LiDAR sensor. For example, time-series data of images and point cloud data obtained by continuously capturing and measuring a public space where recognition target objects (person, animal, car, and the like) come and go with a camera and a sensor such as LiDAR is one example of the observation data 210. The map data 220 represents an image or three-dimensional data of the entire recognition target space. For example, an image and point cloud data obtained by capturing a public space when there is no recognition target object with the camera and the sensor such as LiDAR is one example of the map data 220. A CG image obtained by artificially drawing a public space or the like when there is no recognition target object is another example of the map data 220. That is to say, the map data 220 is equivalent to background data. The object data 230 is an image or three-dimensional data of a recognition target object.

A part of training data 150 generated by the training data generation apparatus 100 is used to train a recognition model 300, and the remaining part is used as test data to test the recognition model 300 after the training. The result of inference output from the recognition model 300 when the test data is input is fed back as output data 400 to the training data generation apparatus 100.

Figure 9:
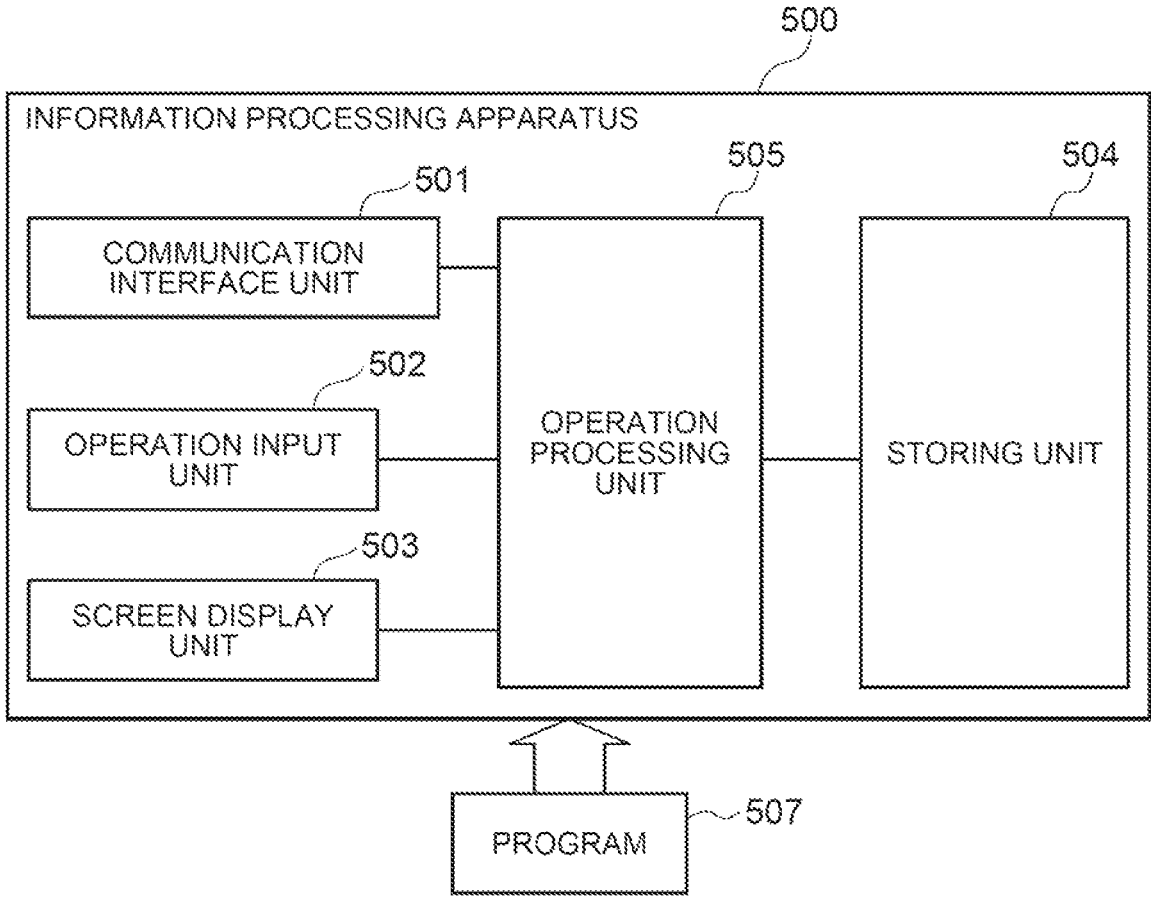
FIG. 9 is a block diagram showing an example of a hardware configuration of a training data generation apparatus of the present invention.

For example, as shown in FIG. 9, the training data generation apparatus 100 can be realized by an information processing apparatus 500 including a communication interface unit 501, an operation input unit 502 such as a keyboard and a mouse, a screen display unit 503 such as a liquid crystal display, a storing unit 504 such as a memory and a hard disk, and an operation processing unit 505 including one or more CPUs (Central Processing Units), and a program 507. The information processing apparatus 500 may be, for example, a personal computer, a smartphone, and the like. The program 507 is loaded into the memory from an external computer-readable storage medium when, for example, the information processing apparatus 500 is started up, and controls an operation of the operation processing unit 505 to realize functional means including the random number generator, the data generating unit 120, the training unit 130 and the parameter updating unit 140 on the operation processing unit 505.

Figure 2:
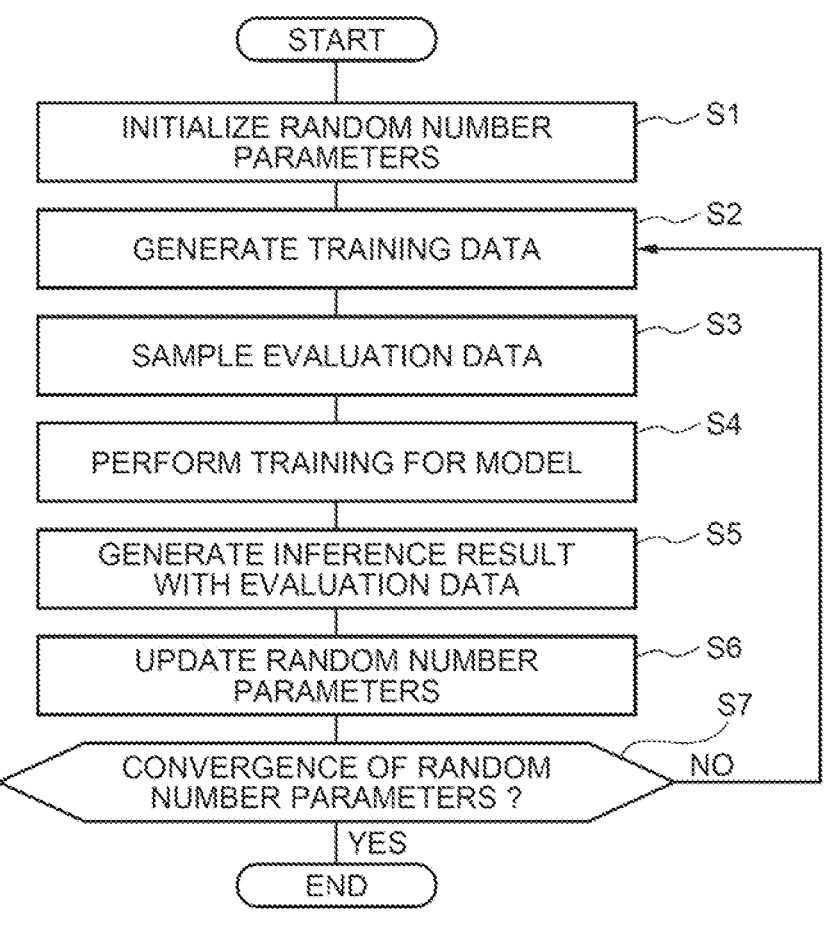
FIG. 2 is a flowchart showing an example of processing by the training data generation apparatus according to the first example embodiment of the present invention.

FIG. 2 is a flowchart showing the flow of an operation at the time of training data generation by the training data generating apparatus 100 according to this example embodiment. The generation of training data is performed after pre-training to be described later is performed. When starting the operation, the training data generation apparatus 100 first initiates random number parameters stored in the random number generator 110 with an appropriate value (S1). Random number parameters herein refer to parameters that specifies the shape of a probability distribution that generates random numbers. For example, in a case where the random number generator 110 generates a random number vector following an n-dimensional normal distribution, the random number parameters represent the mean (p) and variance ($\sigma^2$) of the normal distribution. Next, the random number generator 110 generates a random number vector z of an n-dimensional vector based on the initialized random number parameters, and the data generating unit 120 generates training data based on the random number vector z (S2). Next, the training unit 130 samples evaluation data from the generated training data (S3), and trains the recognition model 300 with the other training data (S4). Next, the training unit 130 evaluates the trained recognition model 300 based on the sampled evaluation data. That is to say, the training unit 130 inputs the evaluation data sampled at step S3 into the recognition model 300 and makes the recognition model 300 perform inference (S5), and transmits the output data 400, which is an inference result, to the parameter updating unit 140.

Upon receiving the inference result, the parameter updating unit 140 compares annotation information in the evaluation data with the inference result for the evaluation data to evaluate the progress of training for each evaluation data, and updates the random number parameters so that untrained spatial data is preferentially generated (S6). As a specific example of the updating method, the parameter updating unit 140 updates the random number parameter by Expression 1.

$$\mu_i \leftarrow \mu_i + \gamma \frac{\partial}{\partial z_i} L(z) \tag{1}$$

In Expression 1, $\mu_i$ is the mean of an i-th component when the random number generator generates a random number vector following the n-dimensional normal distribution and $\gamma$ ($\gamma$>0) is a parameter representing an update width for one time. Moreover, L(z) is a loss function at the time of training. Moreover, $(d/dz_i)L(z)$ is a gradient with respect to a random number vector z of loss, representing the progress of training. That is to say, in the above example, the progress of training is measured with the value of the loss function L(z) at the time of training.

As an example of another method, the parameter updating unit 140 measures the progress of training with the uncertainty of the inference result (for example, entropy of an inference result vector of the recognition model 300), instead of the loss function.

After that, the training data generation apparatus 100 confirms whether or not the update of the random number parameters has converged (S7). The training data generation apparatus 100 returns to step S2 to continue the processing in a case where the update has not converged, and ends the processing of FIG. 2 in a case where the update has converged.

Figure 3:
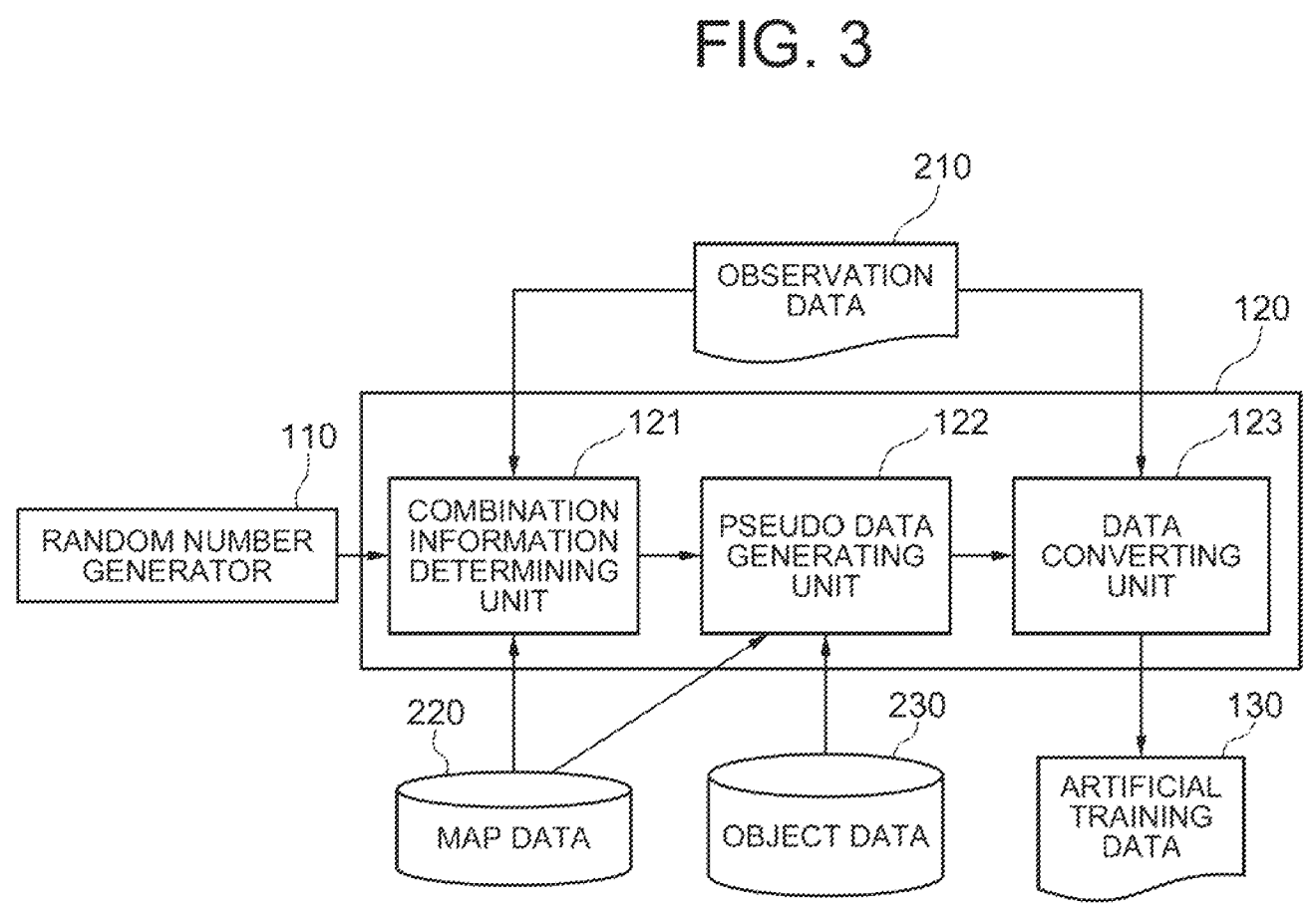

FIG. 3 is a configuration diagram showing an example of the internal structure of the data generating unit 120. The data generating unit 120 includes a combination information determining unit 121, a pseudo data generating unit 122, and a data converting unit 123. The combination information determining unit 121 and the data converting unit 123 perform pre-training using the observation data 210 before the data generating unit 120 generates the training data 150. Pre-training will be described later.

Figure 4:
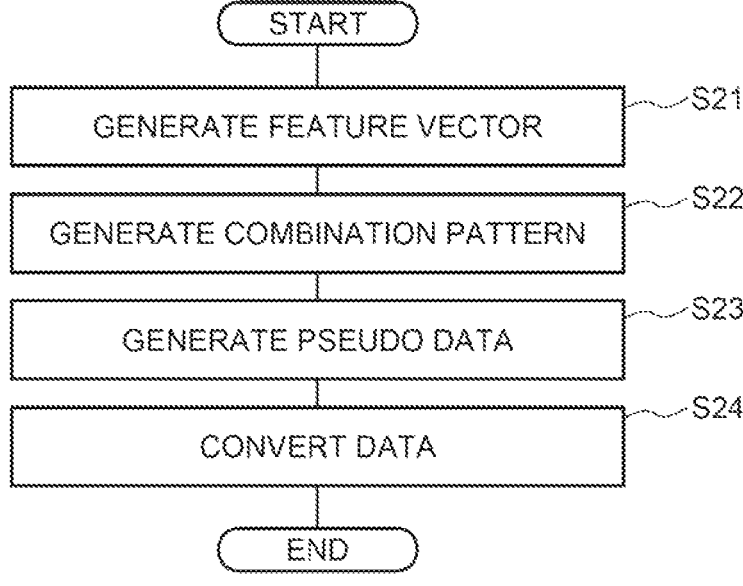
FIG. 4 is a flowchart showing an example of processing by the data generating unit in the training data generation apparatus according to the first example embodiment of the present invention.

FIG. 4 is a flowchart of processing by the data generating unit 120 at the time of training data generation after completion of pre-training. When the random number generator 110 generates a random number vector (sample of feature vector) (S21), the combination information determining unit 121 generates information (combination pattern) such as the location and pose of an object to be combined based on the random number vector and the map data 220 (S22). The pseudo data generating unit 122 generates, with the combination information and the object data 230 as input, pseudo data including an image and point cloud data similar to the actual observation data and annotation data that is the type and location information (bounding box) of the object by three-dimensional model simulation or the like (S23), and transmits the pseudo data to the data converting unit 123. The data converting unit 123, using a neural network trained in advance by Adversarial Training with the observation data 210 as training data, adds data characteristics (characteristics such as fluctuation, noise, and resolution) arising at the time of imaging with a real camera or LiDAR sensor to the image (or point could) data in the pseudo data (S24). The data converting unit 123 puts the converted spatial data and the annotation data received from the pseudo data generating unit 122 together, and outputs the training data 150.

Figure 5:
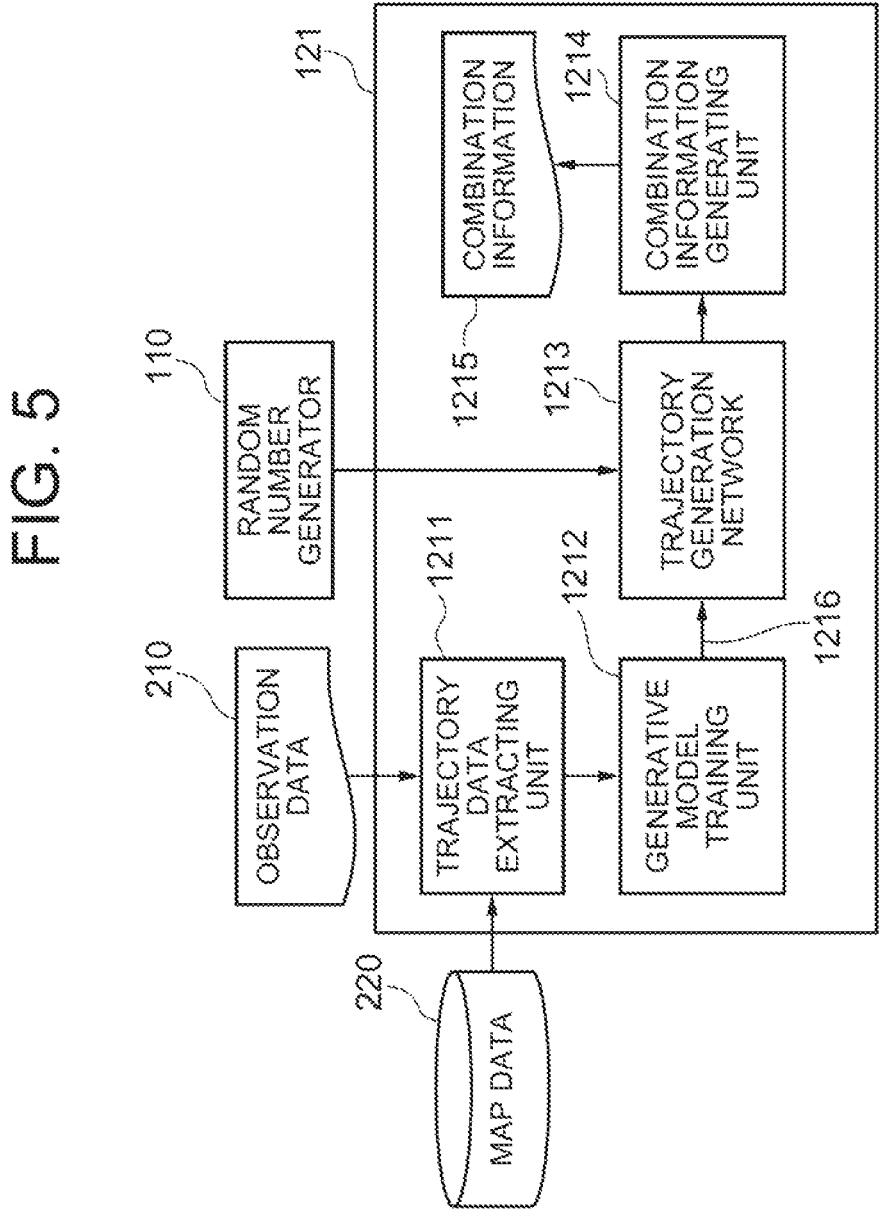
FIG. 5 is a view showing an example of a configuration of a combination information determining unit in the training data generation apparatus according to the first example embodiment of the present invention.

FIG. 5 is a configuration diagram showing an example of an internal structure of the combination information determining unit 121. In this example embodiment, the trajectory of an actual object obtained from the observation data 210 is used for determination of the object combination information. The trajectory data of an object provides the location and direction of travel of the object at a certain point in time. When the direction of travel of an object is known, the pose of the object is known. The combination information determining unit 121 determines the location and pose of an object in pseudo data based on the above information. The combination information determining unit 121 includes a trajectory data extracting unit 1211, a trajectory generation network 1213, a combination information generating unit 1214, and a generative model training unit 1212. On the trajectory generation network 1213, pre-training is performed as preparation for generating training data for training the recognition model 300 by the generative model training unit 1212 with observation data as training data.

Figure 6:
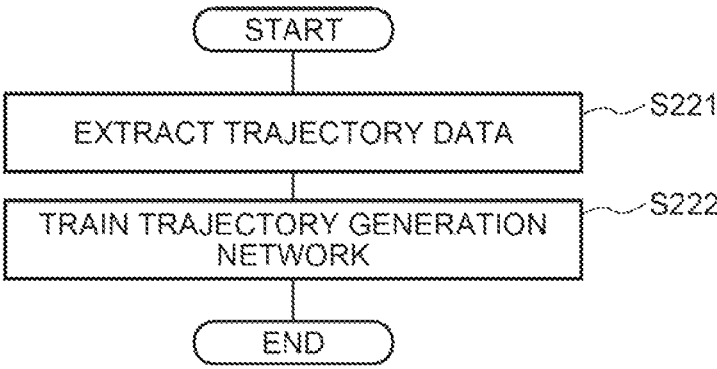
FIG. 6 is a flowchart showing an example of a process of pre-training for a trajectory generation network in the training data generation apparatus according to the first example embodiment of the present invention.

FIG. 6 is a flowchart showing the flow of processing at the time of pre-training for the trajectory generation network 1213. The trajectory data extracting unit 1211 compares the observation data 210 with the map data 220, separates an observation object in the observation data 210 that does not exist in the map data 220 as a recognition target object from other background data in the observation data 210, and extracts the trajectory data 1216 from the temporal transition of the spatial data of the object (S221). The generative model training unit 1212 trains the trajectory generation network 1213 implemented by VAE (Variational autoencoder) or the like with the extracted trajectory data 1216 as training data (S222). For example, in the case of an Encoder-Decoder network such as VAE, with the trajectory data 1216 as training data, the generative model training unit 1212 trains a generative model grounded on the Encoder-Decoder network in conversion from the trajectory data of input data into a latent variable in the encoder and in conversion from the latent variable into pseudo trajectory data in the decoder. When given an n-dimensional vector as a latent variable of VAE, the trained trajectory generation network 1213 can generate pseudo trajectory data of the object corresponding to the value of the given n-dimensional vector.

Figure 7:
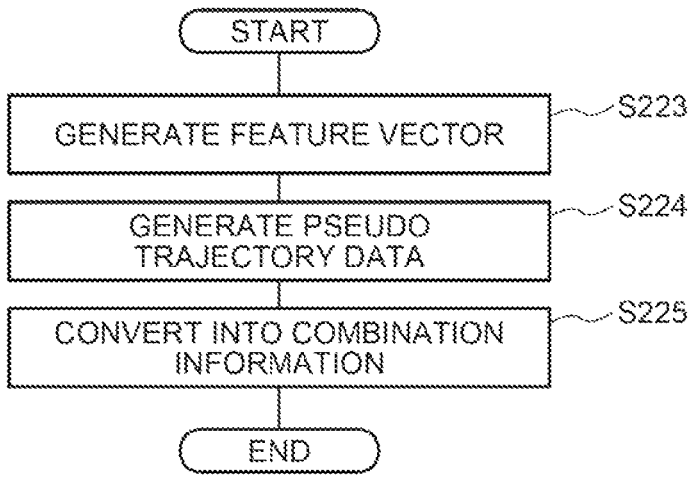
FIG. 7 is a flowchart showing an example of processing by the combination information determining unit in the training data generation apparatus according to the first example embodiment of the present invention.

FIG. 7 is a flowchart showing the flow of processing by the combination information determining unit 121 at the time of combination information generation after pre-training. The combination information determining unit 121 inputs the n-dimensional feature vector generated by the random number generator 110 at step S223 into the trajectory generation network 1213, and generates pseudo trajectory data (S224). The combination information generating unit 1214 converts the generated pseudo trajectory data into location information and pose in the abovementioned manner. The combination information determining unit 121 determines object type based on any rule. The combination information determining unit 121 puts the above information together to generate the combination information 1215 (S225). The generated combination information 1215 is passed from the combination information determining unit 121 to the pseudo data generating unit 122 described above, and the processing continues to step S23 in FIG. 4.

As described above, the training data generation apparatus 100 is a training data generation apparatus that artificially generates a dataset necessary for learning object recognition in a space. The training data generation apparatus 100 includes a means of generating training data including an annotation (teaching signal) from the feature vector of training data encoded as a variable following a probability distribution defined by the set of specific parameters representing the characteristics of distribution. The training data generation apparatus 100 includes a means of artificially generating training data including an annotation from a realization value of a probability distribution defined by the set of parameters of any values, and updating the abovementioned set of parameters based on the degree of recognition of the object recognition model for the generated training data.

Further, the means of updating the abovementioned set of parameters included by the training data generation apparatus 100 uses the loss function of the object recognition model for the artificially generated training data as a measure for measuring the degree of recognition, calculates the gradient of the loss function with respect to the realization values of the probability distribution, and thereby updates the abovementioned set of parameters so that a value at which the loss function becomes greater is more likely to arise as the realization value of the probability distribution.

Further, with observation data in a recognition target space, map data and recognition target object data as input, the means of generating training data including an annotation (teaching signal) from the feature vector of the abovementioned training data included by the training data generation apparatus 100 generates combination information on object type, location and pose that defines how to synthesize the recognition target object with the recognition target space with the abovementioned any feature vector value as input, and generates pseudo data that is pseudo observation data in a case where an object is present in a space with the map data and the combination information as input. In addition, the training data generating means includes a data converting means implemented by a machine learning model, which has been trained by Adversarial Training with observation data and pseudo data as input, capable of data conversion to bring the pseudo data closer to actual observation data, and includes a means of generating training data including annotation information specified by the pseudo data converted by the data converting means and the combined information.

Further, the means of generating the combination information included by the training data generation apparatus 100 extracts the trajectory of an object in observation data in a recognition target space from the observation data and map data. Moreover, the combination information generating means includes a generative model such as VAE trained with the trajectory of an object as training data, and generates pseudo trajectory data with a feature vector generated by a random number as a latent variable in the VAE as input. Moreover, the combination information generating means generates combination information on object type, location and pose that defines how to synthesize a recognition target object, based on the generated pseudo trajectory data.

As described above, according to this example embodiment, in training for an object recognition model, training data that conforms to the actual states of a recognition target space and a recognition target object can be automatically generated in accordance with the progress of the training. Consequently, it is possible to train an object recognition model optimized for recognition target space and object without manual tuning or monitoring.

Second Example Embodiment

Figure 8:
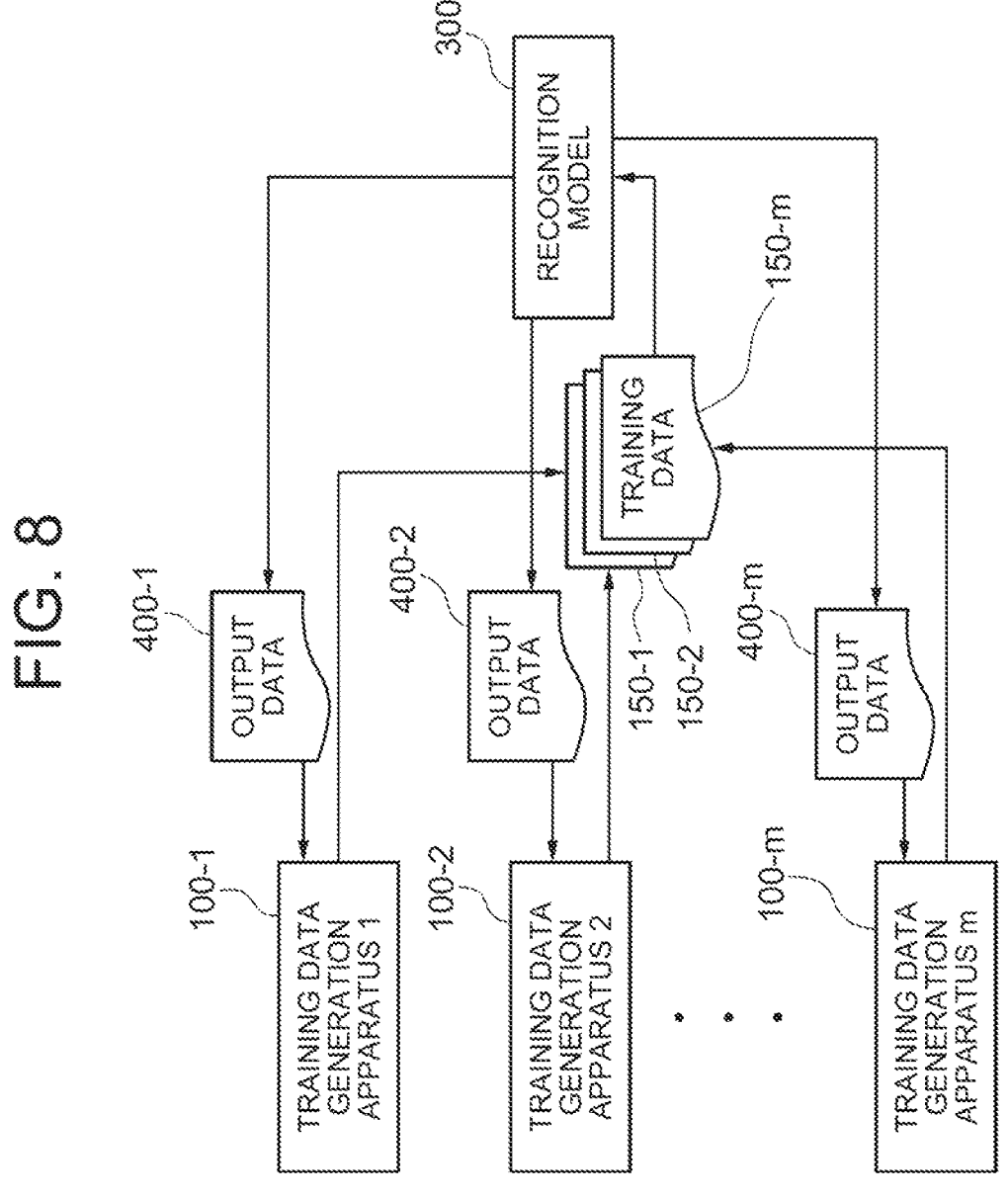
FIG. 8 is a block diagram of a training data generation apparatus according to a second example embodiment of the present invention.

A configuration of a second example embodiment of the present invention will be described. FIG. 8 is a block diagram showing an example of a configuration of the training data generation apparatus 100 in the second example embodiment of the present invention. The difference from the first example embodiment shown in FIG. 1 is that m (m is a natural number of 2 or more) training data generation apparatuses 100 of FIG. 1 are operated simultaneously. Training data 150-$i$ ($i$=1, 2, . . . , m) obtained from one training data generation apparatus 100-$i$ in one iteration (one cycle from generation of a random number vector to update of a random number parameter) is a very small fraction of the entire space of data to be trained. Thus, training data generated by a single training data generation apparatus 100 is biased as a training dataset used in a single training process (S4), and may be inappropriate in some cases. Therefore, in this example embodiment, a plurality of random number generators 110 with random number parameters significantly different from each other (that is, the values of the generated random number vectors and training data are significantly different) are mounted, and the training data generation apparatuses 100 associated with the respective random number generators 110 are operated in parallel. Consequently, the training data 150 having diversity appropriate for training can be generated at high speeds.

The single training process (S4) for the recognition model 300 using the training data generated by the plurality of training data generation apparatuses 100 may be performed individually by the training units 130 included by the respective training data generation apparatuses 100 by using the training data generated by the respective training data generation apparatuses 100, or may be performed representatively and collectively by one of the training units 130.

Further, the single evaluation process (S5) for the recognition model 300 using the training data generated by the plurality of training data generation apparatuses 100 may be performed individually by the training units 130 included by the respective training data generation apparatuses 100 by using the training data generated by the respective training data generation apparatuses 100, or may be performed representatively and collectively by one of the training units 130. Output data 400-$i$, which is the inference result output from the recognition model 300 when the training data generated by the training data generation apparatus 100-$i$ is input into the recognition model 300 as test data, is output to the training data generation apparatus 100-$i$ that is the source of test data input. That is to say, the recognition model 300 performs inference using evaluation data after training for the respective training data generation apparatuses 100, and transmits the output data 400 that are different inference results to the respective training data generation apparatuses 100.

The flow of the processing thereafter in each of the training data generation apparatuses 100 is the same as in the first example embodiment.

According to this example embodiment, it is possible to obtain an unbiased training dataset appropriate for a single training process at high speeds, in addition to the effect in the first example embodiment.

Third Example Embodiment

Figure 10:
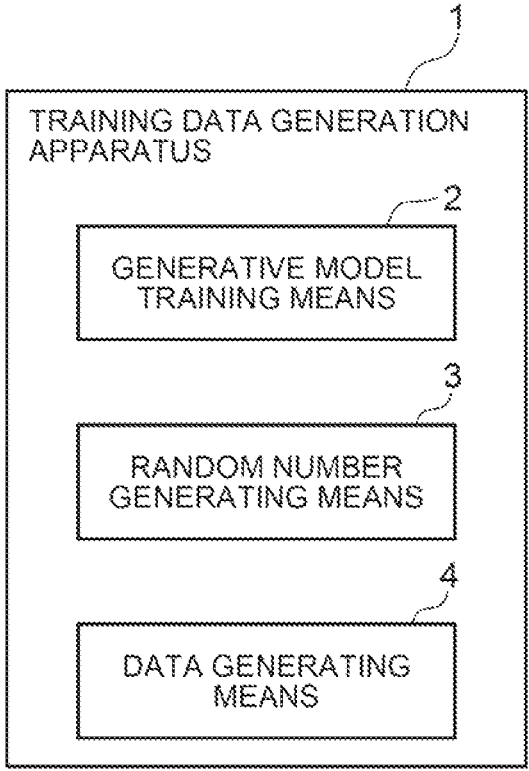
FIG. 10 is a block diagram of a training data generation apparatus according to a third example embodiment of the present invention.

FIG. 10 is a block diagram of a training data generation apparatus 1 according to a third example embodiment of the present invention. In this example embodiment, the overview of a training data generation apparatus of the present invention will be described. Referring to FIG. 10, the training data generation apparatus 1 is an apparatus that generates training data used in training for an object recognition model, and includes a generative model training means 2, a random number generating means 3, and a data generating means 4.

The generative model training means 2 is configured to use the spatial data of an actual object and thereby train a generative model, which is a machine learning model, in conversion from the spatial data to a feature vector and conversion from the feature vector to pseudo spatial data. The spatial data is an image or three-dimensional point cloud data obtained by capturing or measuring a space by a camera or a LiDAR sensor or the like. The spatial data may be, for example, data representing the movement trajectory of an object, or may be data representing the location, pose and the like of an object. The feature vector is a vector configured by the feature value of the spatial data, and one sample is represented as one point in an n-dimensional vector space. For example, a feature vector X of the spatial data is represented by $X=(x_1, x_2, \ldots, x_n)$, where $x_i$ (i=1, 2, ... n) is an i-th component of the n-dimensional vector. The generative model may be, for example, an Encoder-Decoder network such as VAE, but is not limited thereto. The generative model training means 2 uses the actual spatial data as training data to train a generative model grounded on the Encoder-Decoder network in conversion from the spatial data of input data to a latent variable in the encoder and conversion from the latent variable to pseudo spatial data in the decoder. When given an n-dimensional vector as a latent variable, the trained generative model can generate pseudo spatial data corresponding to the values of the given n-dimensional vector.

The random number generating means 3 generates samples of the feature vector as realization values of a probability distribution defined by the set of set parameters. Examples of the probability distribution and the set of parameters defining the probability distribution may be, for example, a normal distribution and the mean and variance of the normal distribution, but are not limited thereto.

The data generating means 4 inputs the samples of the feature vector generated by the random number generating means 3 into the generative model, and thereby generates pseudo spatial data. Moreover, the data generating means 4 generates training data used in training for an object recognition model that is a machine learning model based on the generated pseudo spatial data. The training data includes spatial data and annotation data of an object. The spatial data included by the training data and the generated pseudo spatial data may be the same type of data, or may be different. For example, the spatial data included by the training data and the generated pseudo spatial data may be both spatial data representing the location and pose of an object. Alternatively, the generated pseudo spatial data may be data representing the movement trajectory of an object and the spatial data included by the training data may be data representing the location and pose of an object generated based on the movement trajectory of the object.

The training data generation apparatus 1 configured as described above operates in the following manner. That is to say, the generative model training means 2 uses the spatial data of an actual object to train a generative model in conversion from the spatial data to a feature vector and conversion from the feature vector to pseudo spatial data. Next, the random number generating means 3 generates samples of the feature vector as realization values of a probability distribution defined by the set of set parameters. Next, the data generating means 4 generates training data used in training for an object recognition model based on the pseudo spatial data generated by inputting the generated samples of the feature vector into the generative model.

As described above, the training data generation apparatus 1 uses the spatial data of an actual object to train a generative model in conversion from the spatial data to a feature vector and conversion from the feature vector to pseudo spatial data. Therefore, the pseudo spatial data generated by inputting samples of the feature vector into the generative model, and hence, spatial data of training data generated based thereon meet the actual spatial data. Moreover, when the samples of the feature vector input into the generative model vary, the pseudo spatial data generated by the generative model varies. From the above, according to the training data generation apparatus 1, it is possible to generate knowledge data such as various locations, poses and the like of an object while suppressing generation of training data such as location, pose and the like of an object that are impossible in reality.

The training data generation apparatus 1 according to this example embodiment can be changed in various manners as shown below, for example.

A parameter updating means that updates the set of parameters may further be included. Consequently, it is possible to adjust the shape of distribution of feature vector samples generated by the random number generating means 3, and thus to adjust the shape of distribution of spatial data of training data to be generated finally.

A recognition model training means that trains an object recognition model using extracted part of the training data generated by the data generating means 4 may further be included. Consequently, it is possible to train the object recognition model based on knowledge data such as various locations, poses and the like of an object similar to actual spatial data.

A parameter updating means that tests the trained object recognition model using test data extracted from the training data generated by the data generating means 4 and updating the set of parameters based on the result of the test may further be included. The parameter updating means may use the loss function of the object recognition model with respect to the test data as a measure for measuring the degree of recognition, calculate the gradient of the probability distribution of the loss function with respect to the realization, and update the set of parameters so that a larger value of the loss function is more likely to occur as the realization value of the probability distribution. Consequently, it is possible to generate training data such that training progresses.

The data generating means 4 may generate combination information on the type, location and pose of an object in a recognition target space based on the generated pseudo spatial data, and generate pseudo data, which is pseudo observation data such that an object having object type, location and pose combined based on the combination information is contained in a space. Consequently, it is possible to generate pseudo spatial data for generating object knowledge data such as various locations and poses.

The data generating means 4 may perform data conversion to make the generated pseudo data closer to actual observation data. Consequently, it is possible to generate pseudo spatial data of an object such as various locations and poses similar to the actual observation data.

The data generating means 4 may generate training data including the pseudo data after data conversion and annotation information representing the combined object type, location and pose. Consequently, it is possible to generate knowledge data including spatial data of an object such as various locations and poses similar to the actual observation data.

Although the present invention has been described above with reference to the example embodiments, the present invention is not limited to the above example embodiments. The configurations and details of the present invention can be changed in various manners that can be understood by one skilled in the art within the scope of the present invention. For example, instead of the CPU (Central Processing Unit) described above, a GPU (Graphic Processing Unit), a DSP (Digital Signal Processor), a MPU (Micro Processing Unit), a FPU (Floating number Processing Unit), a PPU (Physics Processing Unit), a TPU (Tensor Processing Unit), a quantum processor, a microcontroller, or a combination thereof can be used.

As an example of utilization of the present invention, application to an automatic training system for a recognition model that autonomously follows changes in the environment (changes of recognition target space and object, and changes of camera and sensor) is considered.

The whole or part of the example embodiments disclosed above can be described as, but not limited to, the following supplementary notes.

(Supplementary Note 1)

A training data generation apparatus comprising:

a generative model training means of, by using spatial data of an actual object, training a generative model, which is a machine learning model, to perform conversion from the spatial data to a feature vector and conversion from the feature vector to pseudo spatial data;

a random number generating means of generating a sample of the feature vector as a realization value of a probability distribution defined by a set of set parameters; and a data generating means of generating training data used in training for an object recognition model, which is a machine learning model, based on the pseudo spatial data generated by inputting the generated sample of the feature vector into the generative model.

(Supplementary Note 2)

The training data generation apparatus according to Supplementary Note 1, further comprising a parameter updating means of updating the set of parameters.

(Supplementary Note 3)

The training data generation apparatus according to Supplementary Note 1 or 2, further comprising a recognition model training means of, by using partial training data extracted from the generated training data, performing training for the object recognition model.

(Supplementary Note 4)

The training data generation apparatus according to Supplementary Notes 1 to 3, further comprising a parameter updating means of, by using test data extracted from the generated training data, performing a test of the object recognition model after the training, and updating the set of parameters based on a result of the test.

(Supplementary Note 5)

The training data generation apparatus according to Supplementary Notes 1 to 4, wherein the parameter updating means uses a loss function of the object recognition model for the test data as a measure for measuring a degree of recognition, calculates a gradient of the loss function with respect to the realization value of the probability distribution, and updates the set of parameters so that a value at which the loss function becomes greater is more likely to occur as the realization value of the probability distribution;

(Supplementary Note 6)

The training data generation apparatus according to Supplementary Notes 1 to 5, wherein the data generating means includes:

a combination information determining means of generating combination information on an object type, location and pose in a recognition target space based on the generated pseudo spatial data;

a pseudo data generating means of generating pseudo data, which is pseudo observation data that an object with an object type, location and pose combined based on the generated combination information is included in a space; and a data converting means of performing data conversion to make the generated pseudo data closer to actual observation data, wherein the data generating means generates the training data including the pseudo data after the data conversion and annotation information representing information of the combined object type, location and pose.

(Supplementary Note 7)

The training data generation apparatus according to Supplementary Notes 1 to 6, wherein the data converting means performs the data conversion using a machine learning model previously trained by Adversarial Training with the observation data as the training data.

(Supplementary Note 8)

The training data generation apparatus according to Supplementary Notes 1 to 7, wherein:

the generative model training means uses trajectory data of an object extracted from the actual object spatial data, and thereby trains the generative model to perform conversion from the trajectory data to a feature vector and conversion from the feature vector to pseudo trajectory data; and the combination information determining means includes a combination information generating means of generating the combination information based on the generated pseudo trajectory data.

(Supplementary Note 9)

The training data generation apparatus according to Supplementary Notes 1 to 8, wherein the generative model includes a variational autoencoder (VAE).

(Supplementary Note 10)

A training data generation apparatus including a plurality of the training data generation apparatuses according to any of Supplementary Notes 1 to 9, the training data generation apparatus being configured to for each of the training data generation apparatuses, extract training data used in training for an object recognition model and test data used in a test after the training from training data generated by the training data generation apparatus, bring together the training data extracted for the respective training data generation apparatuses, and train the object recognition model.

(Supplementary Note 11)

The training data generation apparatus according to Supplementary Note 10, being configured to for each of the training data generation apparatuses, measure a degree of recognition of the object recognition model after the training by using the test data extracted by the training data generation apparatus, and update the set of the parameters based on a result of the measurement.

(Supplementary Note 12)

A training data generation method executed by a computer, the training data generation method comprising:

by using spatial data of an actual object, training a generative model, which is a machine learning model, to perform conversion from the spatial data to a feature vector and conversion from the feature vector to spatial data;

generating a sample of the feature vector as a realization value of a probability distribution defined by a set of set parameters; and generating training data used in training for an object recognition model, which is a machine learning model, based on the pseudo spatial data generated by inputting the generated sample of the feature vector into the generative model.

(Supplementary Note 13)

A computer program comprising instructions to cause a computer to execute processes to:

by using spatial data of an actual object, train a generative model, which is a machine learning model, to perform conversion from the spatial data to a feature vector and conversion from the feature vector to spatial data;

generate a sample of the feature vector as a realization value of a probability distribution defined by a set of set parameters; and generate training data used in training for an object recognition model, which is a machine learning model, based on the pseudo spatial data generated by inputting the generated sample of the feature vector into the generative model.

DESCRIPTION OF REFERENCE NUMERALS

1 training data generation apparatus
2 generative model training unit
3 random number generating unit
4 data generating unit
100 training data generation apparatus
110 random number generator
120 data generating unit
121 combination information determining unit
1211 trajectory data extracting unit
1212 generative model training unit
1213 trajectory generation network
1214 combination information generating unit
1215 combination information
1216 trajectory data
122 pseudo data generating unit
123 data converting unit
130 training unit
140 parameter updating unit
150 training data
200 input data
210 observation data
220 map data
230 object data
300 recognition model
400 output data

The invention claimed is:

1. A training data generation apparatus comprising:

a memory containing program instructions; and a processor coupled to the memory, wherein the processor is configured to execute the program instructions to:

(a) in a training phase, by using spatial data of an actual object, train a generative model to perform conversion from the spatial data to a feature vector and conversion from the feature vector to spatial data, and in an operation phase, store the trained generative model, the trained generative model being capable of outputting spatial data corresponding to a sample of the feature vector;

(b) generate a sample that is a random vector of the feature vector, the sample being a realization value of a probability distribution defined by a set of parameters;

(c) obtain spatial data output from the trained generative model by inputting the generated sample into the trained generative model; and (d) generate training data for use in training an object recognition model based on the obtained spatial data.

2. The training data generation apparatus according to claim 1, wherein the processor is further configured to execute the instructions to:

(e) after generating the training data, update the set of parameters and again execute operations (b), (c) and (d).

3. The training data generation apparatus according to claim 1, wherein the processor is further configured to execute the instructions to:

(e) by using partial training data extracted from the generated training data, perform training for the object recognition model.

4. The training data generation apparatus according to claim 3, wherein the processor is further configured to execute the instructions to:

(f) by using test data extracted from the generated training data, perform a test of the object recognition model after the training, and update the set of parameters based on a result of the test.

5. The training data generation apparatus according to claim 4, wherein the processor is further configured to execute the instructions to:

in the updating the set of parameters, use a loss function of the object recognition model for the test data as a measure for measuring a degree of recognition, calculate a gradient of the loss function with respect to the realization value of the probability distribution, and update the set of parameters so that a value at which the loss function becomes greater is more likely to occur as the realization value of the probability distribution.

6. The training data generation apparatus according to claim 4, wherein the feature vector is an n-dimensional vector, the probability distribution is an n-dimensional normal distribution and the set of parameters comprise a mean u for the i-th component, wherein the processor is further configured to execute the instructions to update the set of parameters by computing a partial derivative $\partial L/\partial z_i$ of the object-recognition model's loss function $L(z)$ for the test data with respect to the realization of the probability distribution, and updating each mean $\mu_i$ in accordance with a next equation so as to move $\mu_i$ in a direction that increases a likelihood of sampling the realization of the probability distribution values that yield larger loss $L(z)$, wherein $$\mu_i \leftarrow \mu_i + \gamma \frac{\partial}{\partial z_i} L(Z), \text{ and}$$

wherein $\gamma$ ($\gamma > 0$) is a positive parameter denoting the per-update step size.

7. The training data generation apparatus according to claim 1, wherein the processor is further configured to execute the instructions, in the generating the training data:

generate combination information on an object type, location and pose in a recognition target space based on the spatial data output from the trained generative model;

generate pseudo data that an object with an object type, location and pose combined based on the generated combination information is included in a space;

perform data conversion to make the generated pseudo data closer to actual observation data; and generate the training data including the pseudo data after the data conversion and annotation information representing information of the combined object type, location and pose.

8. The training data generation apparatus according to claim 7, wherein the processor is further configured to execute the instructions to:

in the data conversion, perform the data conversion using a machine learning model previously trained by Adversarial Training with the observation data as the training data.

9. The training data generation apparatus according to claim 7, wherein the processor is further configured to execute the instructions:

in the training the generative model, use trajectory data of an object extracted from the actual object spatial data, and thereby train the generative model to perform conversion from the trajectory data to a feature vector and conversion from the feature vector to trajectory data; and in the generating the combination information, generate the combination information based on the trajectory data output by the trained generative model.

10. A training data generation method comprising:

(a) in a training phase, by using spatial data of an actual object, training a generative model to perform conversion from the spatial data to a feature vector and conversion from the feature vector to spatial data, and in an operation phase, storing the trained generative model, the trained generative model being capable of outputting spatial data corresponding to a sample of a feature vector;

(b) generating a sample that is a random vector of the feature vector, the sample being a realization value of a probability distribution defined by a set of parameters;

(c) obtain spatial data output from the trained generative model by inputting the generated sample into the trained generative model; and (d) generating training data for use in training an object recognition model based on the obtained spatial data.

11. The method according to claim 10 further comprising:

(e) updating at least one parameter of the set of parameters that defines the probability distribution based on an evaluation of the object-recognition model using generated training or test data, wherein the updating comprises computing a gradient of a loss function of the object-recognition model with respect to the realization of the probability distribution and updating the at least one parameter so as to increase a likelihood of sampling realizations associated with larger loss values.

12. A non-transitory computer-readable medium having a program stored therein, the program comprising instructions to cause a computer to execute processes to:

(a) in a training phase, by using spatial data of an actual object, train a generative model to perform conversion from the spatial data to a feature vector and conversion from the feature vector to spatial data, and in an operation phase, store the trained generative model, the trained generative model being capable of outputting spatial data corresponding to a sample of a feature vector;

(b) generate a sample that is a random vector of the feature vector, the sample being a realization value of a probability distribution defined by a set of parameters; and (c) obtain spatial data output from the trained generative model by inputting the generated sample into the trained generative model; and (d) generate training data for use in training an object recognition model based on the obtained spatial data.

13. The medium according to claim 12, wherein the program further comprises instructions cause the computer to execute processes to:

(e) update at least one parameter of the set of parameters that defines the probability distribution based on an evaluation of the object-recognition model using generated training or test data, wherein the updating comprises computing a gradient of a loss function of the object-recognition model with respect to the realization of the probability distribution and updating the at least one parameter so as to increase a likelihood of sampling realizations associated with larger loss values.

* * * * *